United States Patent [19]
Matsuoka

[11] Patent Number: 6,121,548
[45] Date of Patent: Sep. 19, 2000

[54] ELECTRICAL CONNECTION BOX

[75] Inventor: Hideo Matsuoka, Yokkaichi, Japan

[73] Assignee: Sumitomo Wiring Systems, Ltd., Yokkaichi, Japan

[21] Appl. No.: 09/139,329

[22] Filed: Aug. 25, 1998

[30] Foreign Application Priority Data

Sep. 24, 1997 [JP] Japan ..................... 9-259077

[51] Int. Cl.[7] .................................................. H02G 3/18
[52] U.S. Cl. .................................... 174/59; 174/72 A
[58] Field of Search ............................ 174/72 A, 50, 174/59, 60, 66, 67; 220/241, 242, 3.8

[56] References Cited

U.S. PATENT DOCUMENTS

| | | | |
|---|---|---|---|
| 2,148,872 | 2/1939 | Nicholas | 200/52 |
| 3,106,602 | 10/1963 | Hartz | 174/60 |
| 3,234,318 | 2/1966 | Lieshout et al. | 174/35 |
| 3,617,612 | 11/1971 | Patton | 174/59 |
| 4,700,015 | 10/1987 | Saito et al. | 174/50 |
| 4,731,501 | 3/1988 | Clark et al. | 174/59 X |
| 5,001,298 | 3/1991 | Jong | 174/50 X |
| 5,153,380 | 10/1992 | Chang | 174/50 X |
| 5,430,248 | 7/1995 | Levy | 174/50 |
| 5,435,453 | 7/1995 | Higuchi . | |
| 5,515,988 | 5/1996 | Oda . | |
| 5,532,431 | 7/1996 | Saka et al. . | |
| 5,702,021 | 12/1997 | Ito . | |

FOREIGN PATENT DOCUMENTS 1-180123 12/1989 Japan .

Primary Examiner—Dean A. Reichard
Attorney, Agent, or Firm—Greenblum & Bernstein, P.L.C.

[57] ABSTRACT

The present invention provides an electric connection box capable of preventing water from entering into the inside from the clearance between a closing area and an upper cover, thereby improving the water tightness. An electric connection box formed is formed of synthetic resin and includes a lower cover. An electric component mounting block housed in the lower cover, and an upper cover interfits with the lower cover. In addition, a guiding groove having an open upper area opened for passing a wire harness is provided in the lower cover, and a closing member is provided on the electric component mounting block for closing the guiding groove in the lower cover. Furthermore, in order to close a clearance between the closing member and the upper cover, a projection is formed either on the closing member or on the upper cover. With this projection, water is prevented from entering into the inner area of the electric connection box.

13 Claims, 4 Drawing Sheets

ELECTRICAL CONNECTION BOX

BACKGROUND OF THE INVENTION

1. Field of the Invention

The present invention relates to an electric connection box to be mounted, for instance, in an engine compartment of a vehicle and the like.

2. Description of Background Information

An electric connection box or junction box of this type serves as a connecting junction for wiring materials such as a wire harness, etc., incorporating various electric components, such as for an automobile electric circuit, etc. The types of such connection boxes vary in accordance with the kinds of automobiles and their use.

A conventional electric connection box 101 is shown in FIG. 7 and includes a lower cover 102, an electric component mounting block 103 housed in the lower cover 102, and an upper cover 104 interfitting with the lower cover 102. In addition, in order to insert a wire harness, which is not illustrated, in the lower cover 102 therethrough, a guiding groove 105 with an open upper surface is provided, and on the electric component housing block 103, a closing area 106 is provided for closing the guiding groove 105. By interfitting the upper cover 104 with the lower cover 102, a water-proof function is given to the electric connection box 101.

As shown in FIG. 7, with the conventional electric connection box 101, however, there is inevitably a clearance having a thickness as thick as that of the upper cover 104 between the closing area 106 of electric component mounting block 103 and the upper cover 104. The result is that there is a potential for leakage of water into the electric connection box 101 through the clearance.

The present invention was made to solve the above-mentioned problem, in order to prevent water from entering into the inside between the closed area and the upper cover, thereby providing a better electric connection box with improved water tightness.

SUMMARY OF THE INVENTION

In order to solve the above-mentioned problem, the present invention provides an electric connection box that includes a lower cover having an open upper surface and an electric component housing block housed in the lower cover and provided with an electric component mounting block for mounting electric components.

An upper cover, which interfits with the lower cover, has an open lower surface, and a guiding groove is provided on the lower cover for a wire harness to pass through. Furthermore, a closing member for closing the guiding groove is provided on the electric component mounting block, and a closing device for closing a clearance between the closing area and said upper cover is also provided.

In accordance with a first aspect of the present invention, an electric connection box includes a lower cover having an open upper surface, and an electric component mounting block housed in the lower cover and provided with an electric component mounting area for mounting electric components. An upper cover having an open lower surface which is capable of interfitting with the lower cover is provided, and a guiding groove is provided on the lower cover. The guiding groove has an open upper surface for a wire harness to extend through, and a closing member for closing said guiding groove is provided on the electric component mounting block. Additionally, a closing device for closing a clearance between the closing member and the upper cover is provided on one of the electric component mounting block and the upper cover.

According to another aspect of the present invention, the closing device includes a projection formed on closing member. Alternatively, the, closing device may include a projection formed inside the upper cover.

According to a further aspect of the invention, the mounting block includes a downwardly extending peripheral side wall, and the closing member is formed by a pair of spaced, downwardly extending slots in said side wall. A pair of supporting guides may be provided, with each supporting guide positioned on an opposite side of the supporting groove for receipt within a respective one of said slots. Furthermore, the closing member may further include a downwardly extending portion, thereby resulting in a generally T-shape configuration of the closing member.

In another aspect of the present invention, an outwardly projecting rim portion is formed about an upper periphery of the lower cover for supporting the lower surface of the upper cover. The closing device includes a projection formed on the closing member that bridges a gap in the rim portion in the area of the guiding groove. Furthermore, the closing device may be configured as an outwardly projecting, generally U-shaped portion formed on an upper portion of the closing member.

According to another aspect of the invention, the closing device includes a projection formed inside the upper cover that bridges a gap in said rim portion in the area of the guiding groove. The closing device may be configured as an inwardly extending portion projecting from a lowermost edge of the upper cover.

In the present invention, an important feature is that the closing device is formed as a projection on the closing member in the electric connection box. Alternatively, a further feature of the present invention is that the closing device is a projection formed on the upper cover.

BRIEF DESCRIPTION OF THE DRAWINGS

The present invention is further described in the detailed description which follows, by reference to the drawings by way of non-limiting examples or preferred embodiments of the present invention, in which like reference numerals represent similar parts throughout the illustrations, and wherein.

DETAILED DESCRIPTION OF THE PREFERRED EMBODIMENTS

Figure 1:
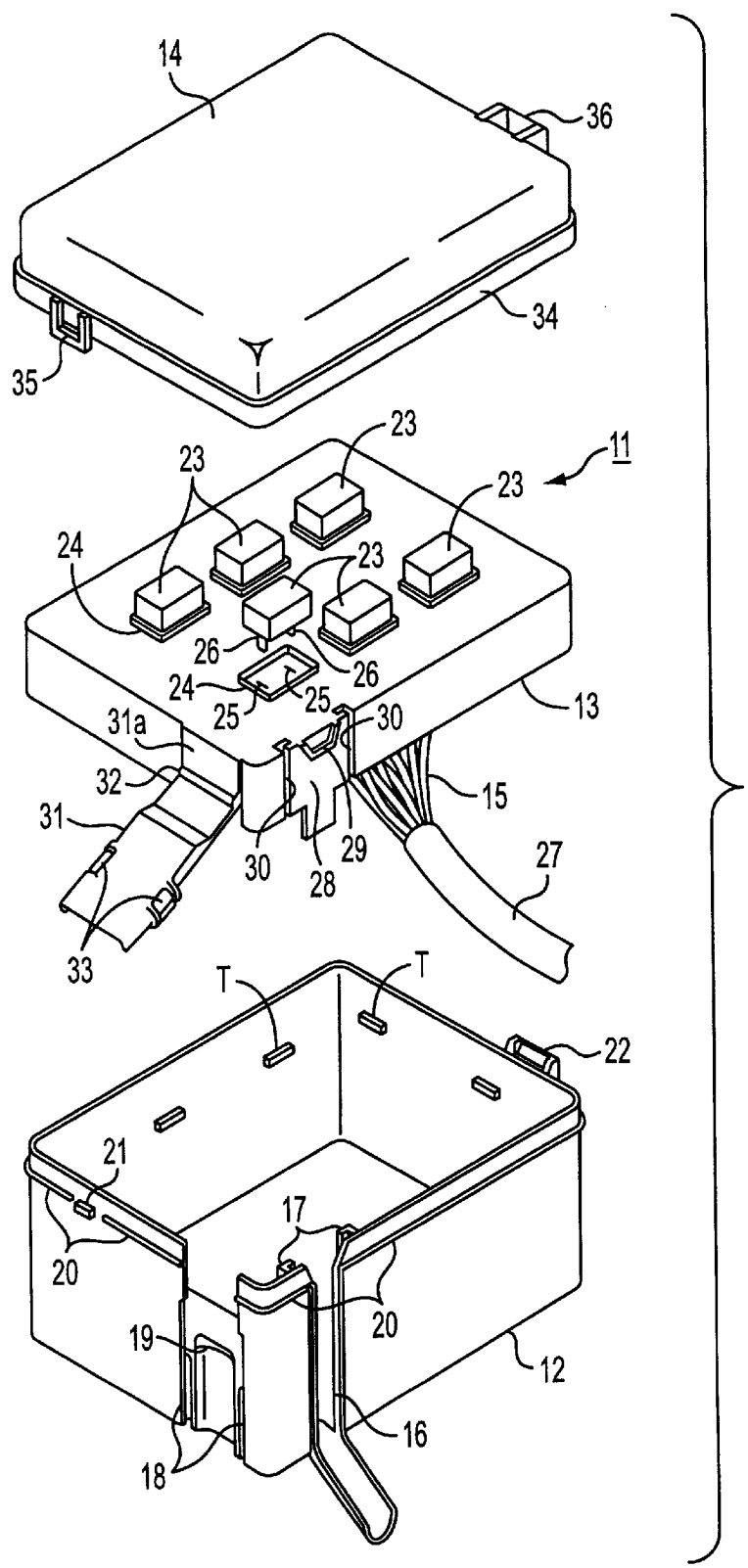
FIG. 1 illustrates an exploded perspective view of one embodiment of the electric connection box of the present invention.

A first embodiment of the present invention is described as follows with respect to FIG. 1 to FIG. 5. As shown in FIG. 1, an electric connection box 11 is formed of synthetic resin, and includes a lower cover 12 forming a box shape with an upper surface. The lower cover 12 is formed with a guiding groove 16 on a side wall thereof, and the guiding groove 16 has an open upper surface for inserting a wire harness 15 into the connection box 11. The lower cover 12 includes tabs T, or other suitable projections, positioned on the inner walls of the lower cover 12 to support the electric connection box 11 at a desired elevation. In addition, inside the lower cover 12, a pair of supporting guides 17 is provided, with one supporting guide extending along opposite sides of the guiding groove 16. Each guide 17 has an L-shape cross-section, with one leg thereof attached to the sidewall of the lower cover 12 adjacent the guiding groove 16, and the other leg extends generally parallel to the sidewall to define opposing grooves forming the supporting guides 17. Furthermore, a pair of spaced engaging grooves 18 are formed in one side wall of the lower cover 12, and an aperture 19 is provided near an upper part of a recess formed between the engaging grooves 18.

On the upper periphery of the lower cover 12, a projecting rim 20 is formed for supporting the lower surface of the upper cover 14, as well as a projection 21 and an engagement area 22 for fastening the upper cover 14.

An electric component mounting block 13 is adapted to be housed within the lower cover 12, and the upper surface of electric component mounting block 13 is provided with an electric component mounting area 24 for mounting respective electric components 23 such as relays, etc. And, by inserting a terminal 26 of electric component 23 into a receptacle 25 provided in the electric component mounting area 24, the electric component 23 is mounted on the electric component mounting block 13 and is electrically connected with an electric circuit, which is not illustrated here. A wire harness 15 for electrically connecting an electric component 23 mounted on the electric component mounting area 24 and a related electrical device (not shown) extends from the lower surface of the electric component mounting block 13. The wire harness 15 is bundled with a bundling tape to form a wire harness bundle 27.

A generally T-shaped closing member 28 for closing the guiding groove 16 is provided on one side wall of electric component mounting block 13. On the upper area of the closing member 28, a generally U-shaped protrusion 29 is formed, and a supporting slot 30 is formed on each side of the protrusion 29 to receive a respective supporting guide 17. In addition, an auxiliary cover 31 is provided on one side wall of electric component mounting area. Auxiliary cover 31 includes a hinge area 32 and is provided with a pair of protrusions 33 projecting from opposite sides thereof for mating with a respective engaging groove 18. In this case, a base end 3 1a of auxiliary cover 31 is formed to project from the side wall of electric component mounting block 13 by a thickness substantially equal to the thickness of the wall of lower cover 12.

The upper cover 14 forms a box, with an open lower surface which interfits with the upper area of the lower cover 12. The upper cover 14 is formed with a skirt 34, on which a fastening element 35 is formed to project and which corresponds to the protrusion 21 on the lower cover 12. In addition, convex engagement area 36 is formed to project in an engageable manner with the engagement area 22 from the upper area of the upper cover toward the lower area. Engagement areas 22 and 36 are known and will not be described further.

Assembly of an electric connection box from the elements described above is as follows. First, an electric component connection mounting block 13 is positioned within a lower cover 12. Then, after passing a wire harness 15 out of the guiding groove 16 toward the outside, a closing member 28 is positioned by inserting a supporting slot 30 in cooperation with a respective supporting guide 17, and each engaging groove 18 is engaged by a respective protrusion 33 of auxiliary cover 31.

Figure 4:
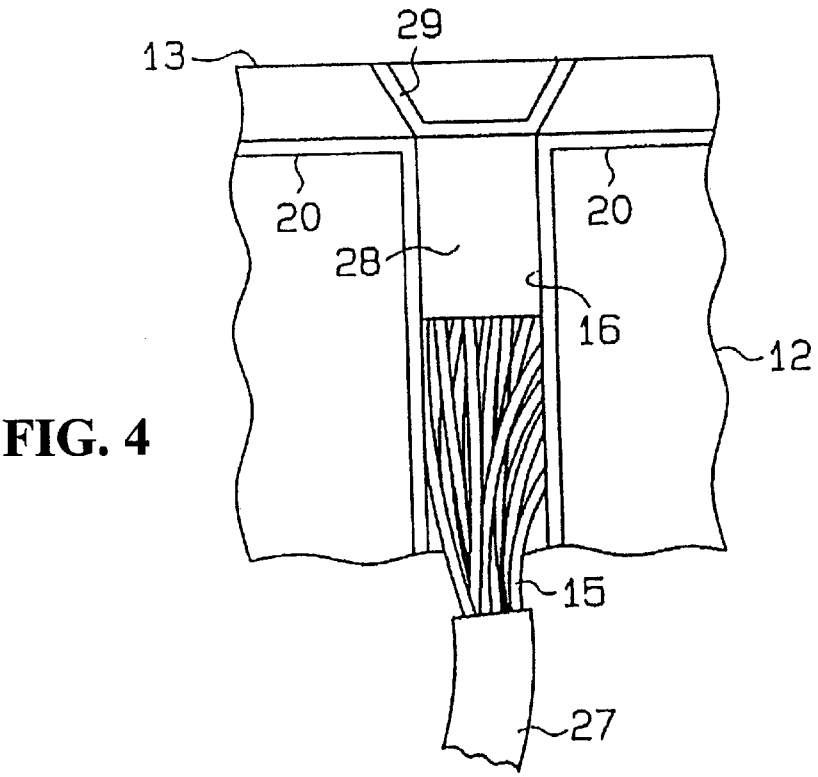
FIG. 4 illustrates a front sectional view taken through the electric connection box in the area of the closing member, and showing a condition in which a lower cover and a projection are at the same surface level.
Figure 5:
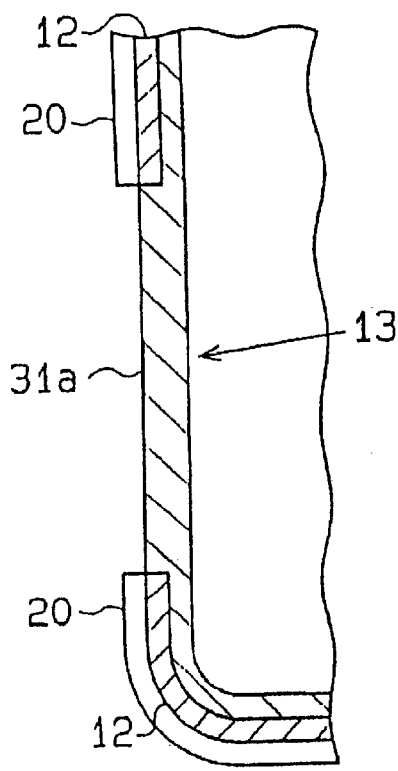
FIG. 5 illustrates a top sectional view taken through the electrical connection box in the area of an auxiliary cover showing a condition in which the lower cover and the auxiliary cover are at the same surface level.

In this embodiment, as shown in FIG. 4, the guiding groove 16 is closed off by the closing member 28 up to the immediate top of the wire harness which is passed out to the outside. In addition, the upper side area above the projecting rim 20 of the lower cover 12 and the projection 29 formed on the closing member 28 are positioned at the same level. Furthermore, as shown in FIG. 5, the upper side above the projecting rim 20 of the lower cover 12 and the base area 3 1a of the auxiliary cover 31 are positioned in the same plane, because the base area 31 projects from the side wall of the electric component mounting block 13 by a thickness substantially equal to the thickness of the lower cover 12.

Figure 2:
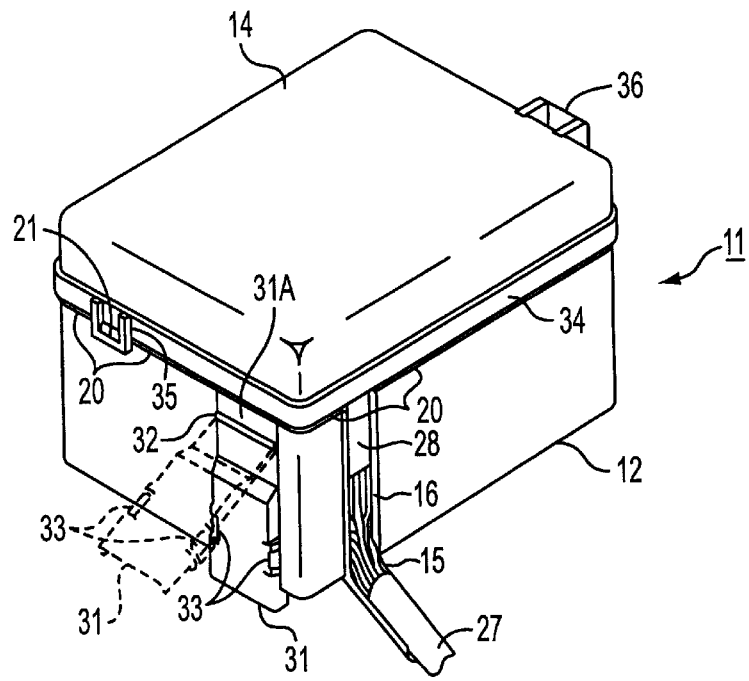
FIG. 2 illustrates a perspective view showing an assembled condition of an electric connection box of the present invention.

Then, as shown in FIGS. 1 and 2, the upper cover 14 is mounted on the lower cover 12 so that the skirt 34 engages with the projecting rim 20 of the lower cover 12. Then, the fastening element 35 is fastened on the projection 21, and convex engagement area 36 is brought into engagement with the engagement area 22. In this way, the electric connection box 11 is assembled. Furthermore, the auxiliary cover 31 can be pivoted to an open position by the hinged area 32 when the protrusions 33 are disengaged from the engaging grooves 18, as shown in phantom in FIG. 2. In this case, wiring, or the like, which is not illustrated here, can be passed to the outside from the aperture 19 or the like.

The description of a function and an effect of the operation of the present embodiment will now be described.

Figure 3:
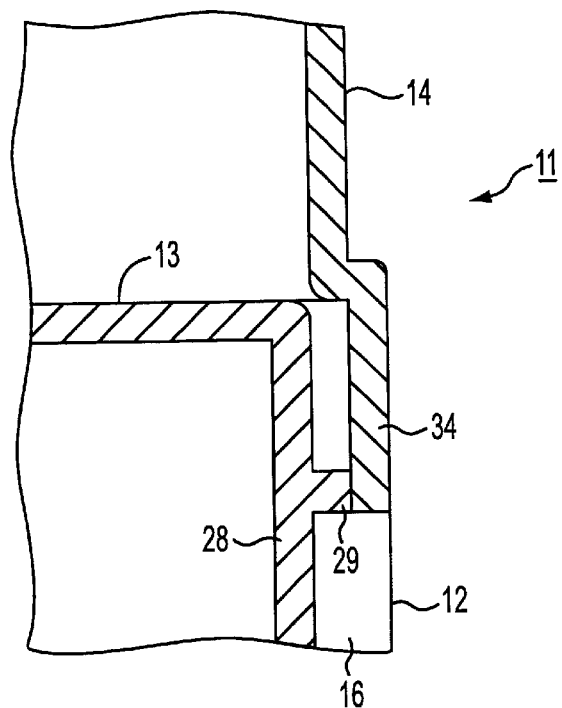
FIG. 3 illustrates a sectional view taken through the electric connection box in the area of the guiding groove, and diagrammatically showing a first embodiment of the electric connection box of the present invention.

According to the first embodiment, as shown in FIG. 3, a projection 29 is formed on a closing member 28 in order to close a clearance between the closing member 28 and an upper cover 14. Furthermore, an area above the projecting rim 20 of the lower cover 12 and the projection 29 formed on the closing member 28 are positioned to form a surface at the same level. Therefore, water intrusion into the inside of the electric connection box 11 is prevented due to closing by the projection 29 even if water is to enter into the clearance between the closing member 28 and the upper cover 14. Therefore, water-tightness of the electric connection box 11 can be improved.

Furthermore, with the present embodiment, an area of the lower cover 12 above the projecting rim 20 and the base area 3 1a of the auxiliary cover 31 are formed to be substantially coplanar. Therefore, water can be prevented from entering the clearance between the area above the projecting rim of the lower cover 12 and the base area 31 when the upper cover 14 is interfitted with the lower cover 12.

The present invention is not limited to the above embodiment and can be achieved as follows with proper modification of parts of the structure, which falls within the spirit and scope of the present invention.

Figure 6:
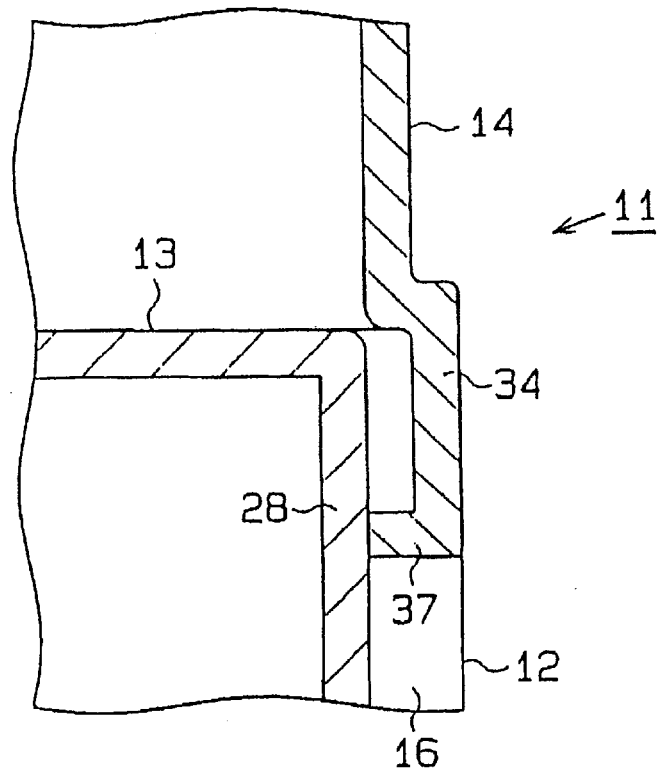
FIG. 6 illustrates a sectional view in the area of the guiding groove, and diagrammatically showing a second embodiment of the electric connection box.
Figure 7:
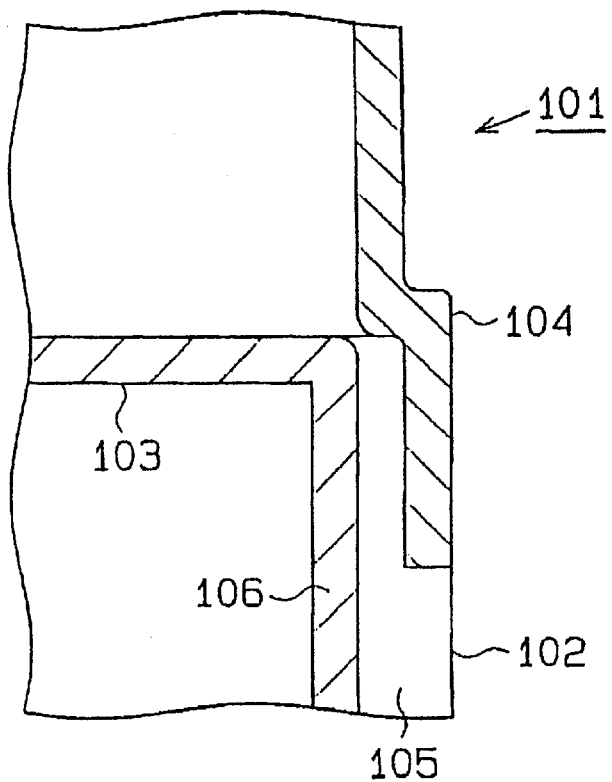
FIG. 7 illustrates a sectional view in the area of the guiding groove, and diagrammatically showing a conventional electrical connection box.

As shown in FIG. 6, in an effort to delete the projection 29 and close the clearance between a closing member 28 and an upper cover 14, a projection 37 is formed on the upper cover 14. Even in case of structuring like this, a clearance between the closing member 28 and the upper cover 14 is closed by the projection 37 formed on the upper cover 14, and the same result as in the first embodiment can be achieved. Furthermore, the shape of the projection 37 can take any form so long as it has a form that can closely fill the clearance between the closing member 28 and the upper cover 14. Thus, the projection 37 is not restricted to a particular form.

In a modification of the first embodiment, although the projection 29 was formed in a generally U-shape, it may be, for example, formed in a straight line or in a curved shape. The shape of the projection 29 is not restricted to any particular form so long as it can closely fill the clearance between the closed area and the upper cover 14.

In a further modification of the first embodiment, the auxiliary cover 31 provided on the electric component mounting block 13 may be omitted. In addition, by omitting the auxiliary cover 31, the lower cover 12 may be formed so that the side wall, other than the projecting rim 20 and projection 21, is formed at the same surface level by omitting the engaging grooves 18 and aperture 19 etc., from the lower cover 12.

With the electric connection box 11 according to the invention, a packing or seal may be provided between the lower cover 12 and the upper cover 14. With this structure, further improvement in water-tightness can be achieved.

In the present case, the "electric connection box" as described in the present specification refers to any form of devices which exist between devices provided for connecting the wiring of wire harness and the like, and is not only restricted to a so-called junction box.

The present invention is constructed as set forth above, and achieves the following effects. According to a first aspect of the invention, a closing mechanism is provided for closing the clearance between the closing area and the upper cover. Therefore, with the disclosed closing mechanism, water entering the inside through the clearance between the closing area and the upper cover can be prevented, thereby improving water tightness.

According to another aspect of the present invention, a projection is formed on the closing member to close the clearance between the closing area and the upper cover, thereby resulting in improved water tightness.

According to a further aspect of the present invention, a projection is formed in the inside of the upper cover in order to close the clearance between the closing member and the upper cover, thereby resulting in improved water tightness.

Although the invention has been described herein with reference to particular means, materials and embodiments, the invention is not intended to be limited to the particulars disclosed herein; rather, the invention extends to all functionally equivalent structures, methods and uses, such as are within the scope of the appended claims.

The present disclosure relates to subject matter contained in priority Japanese Application No. HEI 9-259077 filed on Sep. 24, 1997, which is herein expressly incorporated by reference in its entirety.

What is claimed:

1. An electric connection box comprising:

a lower cover having an open upper surface;

an electric component mounting block housed in said lower cover and provided with an electric component mounting area for mounting electric components;

an upper cover having an open lower surface configured to interfit with said lower cover, wherein said upper cover engages said lower cover in an assembled condition of said electric connection box;

a guiding groove provided on said lower cover, said guiding groove having an open upper surface for a wire harness to extend through;

a closing member formed unitarily with said electric component mounting block, said closing member configured to close said guiding groove; and wherein a closing device for closing a clearance between said closing member and said upper cover is provided on one of the electric component mounting block and the upper cover.

2. An electric connection box as set forth in claim 1, wherein said closing device includes a projection formed on said closing member.

3. An electric connection box as set forth in claim 1, wherein said closing device includes a projection formed inside said upper cover.

4. An electric connection box as set forth in claim 1, wherein said mounting block comprises a downwardly extending peripheral side wall, said closing member being formed by a pair of spaced, downwardly extending slots in said side wall.

5. An electric connection box as set forth in claim 4, further comprising a pair of supporting guides, each supporting guide positioned on an opposite side of said guiding groove for receipt within a respective one of said slots.

6. An electric connection box as set forth in claim 4, wherein said closing member further comprises a downwardly extending portion, thereby resulting in a generally T-shape configuration of said closing member.

7. An electric connection box as set forth in claim 1, further comprising an outwardly projecting rim portion formed about an upper periphery of said lower cover for supporting said lower surface of said upper cover.

8. An electric connection box as set forth in claim 7, wherein said closing device includes a projection formed on said closing member that bridges a gap in said rim portion in the area of said guiding groove.

9. An electric connection box as set forth in claim 8, wherein said projection is configured as an outwardly projecting, generally U-shaped portion formed on an upper portion of said closing member.

10. An electric connection box as set forth in claim 7, wherein said closing device includes a projection formed inside said upper cover that bridges a gap in said rim portion in the area of said guiding groove.

11. An electric connection box as set forth in claim 10, wherein said projection is configured as an inwardly extending portion projecting from a lowermost edge of said upper cover.

12. An electric connection box comprising:

a lower cover having an open upper surface;

an electric component mounting block housed in the lower cover and provided with an electric component mounting area for mounting electric components;

an upper cover having an open lower surface which is capable of interfitting with said lower cover;

a guiding groove provided on said lower cover, said guiding groove having an open upper surface for a wire harness to extend through;

a closing member for closing said guiding groove provided on said electric component mounting block; and wherein a closing device for closing a clearance between said closing member and said upper cover is provided on one of the electric component mounting block and the upper cover, wherein said closing device includes a projection formed on said closing member that bridges a gap in said rim portion in the area of said guiding groove, and said projection being configured as an outwardly projecting, generally U-shaped portion formed on an upper portion of said closing member.

13. An electric connection box comprising:

a lower cover having an open upper surface;

an electric component mounting block housed in the lower cover and provided with an electric component mounting area for mounting electric components;

an upper cover having an open lower surface which is capable of interfitting with said lower cover;

a guiding groove provided on said lower cover, said guiding groove having an open upper surface for a wire harness to extend through, and an outwardly projecting rim portion formed about an upper periphery of said lower cover for supporting said lower surface of said upper cover;

a closing member for closing said guiding groove provided on said electric component mounting block; and wherein a closing device for closing a clearance between said closing member and said upper cover is provided on one of the electric component mounting block and the upper cover, said closing device including a projection formed inside said upper cover that bridges a gap in said rim portion in the area of said guiding groove, said projection being configured as an inwardly extending portion projecting from a lowermost edge of said upper cover.

* * * * *